United States Patent
Sim et al.

(10) Patent No.: US 6,771,974 B1
(45) Date of Patent: Aug. 3, 2004

(54) APPARATUS FOR CONTROLLING A SHORT MESSAGE SERVICE OF A DIGITAL MOBILE STATION AND METHOD THEREFOR

(75) Inventors: Seng-Wook Sim, Suwon-shi (KR); Joung-Kyou Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 523 days.

(21) Appl. No.: 09/602,407

(22) Filed: Jun. 23, 2000

(30) Foreign Application Priority Data

Jun. 24, 1999 (KR) .......................................... 1999-24000

(51) Int. Cl.[7] .............................. H04Q 7/20; H04M 1/00
(52) U.S. Cl. ........................ 455/466; 455/566; 340/7.21
(58) Field of Search .................................. 455/550, 566, 455/575, 558, 90, 922, 31.3, 38.4, 567, 32.1, 38.2; 340/825.4; 345/812, 1.1, 1.2, 2.1, 2.3, 781, 790–797; 379/433.4

(56) References Cited

U.S. PATENT DOCUMENTS

| | | | | |
|---|---|---|---|---|
| 6,009,308 A | * | 12/1999 | Matsuura | .................... 455/31.3 |
| 6,032,021 A | * | 2/2000 | Sato | ........................... 455/31.1 |
| 6,044,153 A | * | 3/2000 | Kaschke | ...................... 379/433 |
| 6,125,281 A | * | 9/2000 | Wells et al. | ................. 455/466 |
| 6,341,228 B1 | * | 1/2002 | Hubbe et al. | ............... 455/566 |
| 6,487,424 B1 | * | 11/2002 | Kraft et al. | .................. 455/566 |

* cited by examiner

Primary Examiner—Lester G. Kincaid
Assistant Examiner—N Mehrpour
(74) Attorney, Agent, or Firm—Dilworth & Barrese, LLP.

(57) ABSTRACT

Disclosed is an apparatus for controlling the SMS of a digital mobile station, which enables both the sender and receiver to exchange short messages in a duplex mode. The apparatus comprises a display with a message screen capable of dividing the message screen into at least two display regions, a distinction message detector for detecting a predefined distinction message contained in a received message, and a control unit for causing the received message to be displayed on a selected one of the at least two display regions if the distinction message is detected.

16 Claims, 5 Drawing Sheets

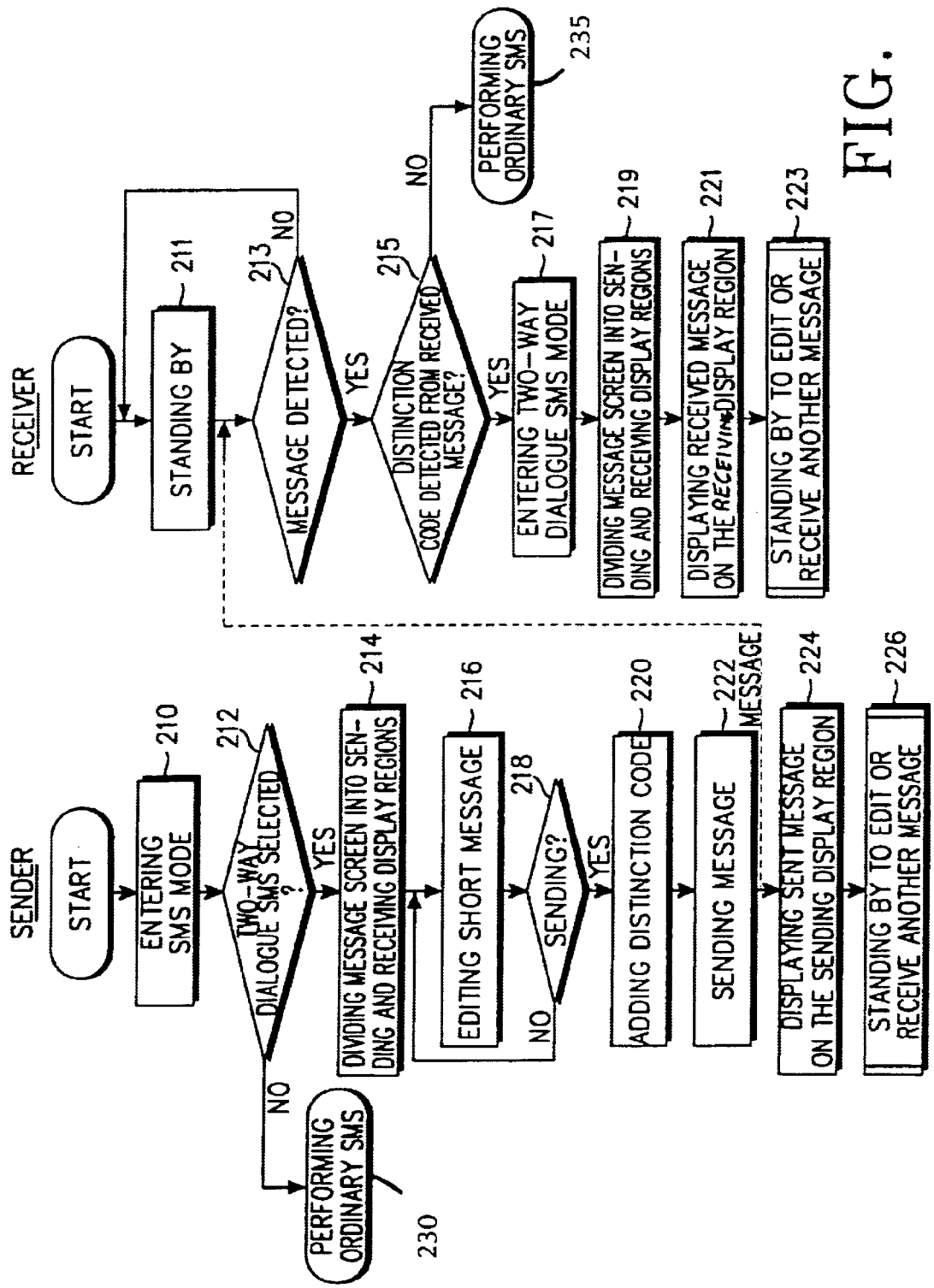

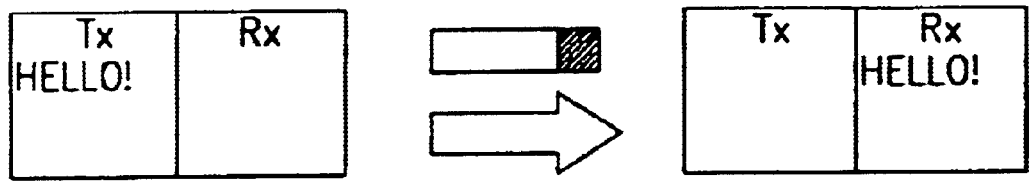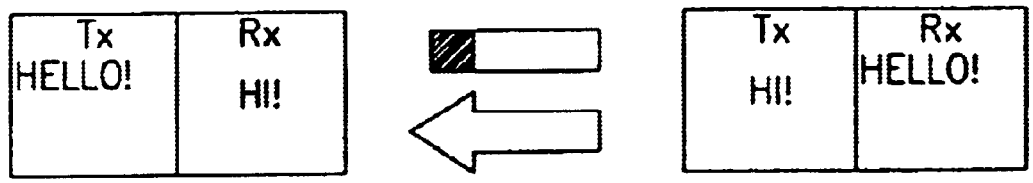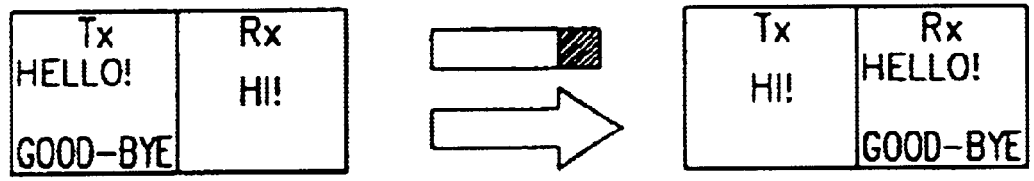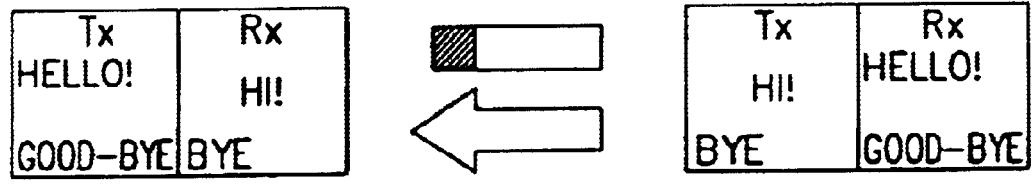
FIG. 4

APPARATUS FOR CONTROLLING A SHORT MESSAGE SERVICE OF A DIGITAL MOBILE STATION AND METHOD THEREFOR

BACKGROUND OF THE INVENTION

1. Field of the Invention

The present invention relates to an apparatus for controlling a short message service (SMS) of a digital mobile station, and method therefore.

2. Description of the Related Art

The conventional digital mobile phone provides the user with an SMS function through which short character messages may be exchanged in addition to ordinary voice communications. The SMS function is achieved by modifying the digital mobile communications system, and providing the digital mobile station with a device for editing, inputting and sending the short message. However, the conventional SMS function only provides one-way transmission of the short message, therefore, the sender and receiver cannot exchange short messages with each other in real time as in two-way voice communications.

SUMMARY OF THE INVENTION

It is an object of the present invention to provide an apparatus for controlling the SMS function of a digital mobile station which enables both the sender and receiver to exchange short messages with each other in real time.

According to an aspect of the present invention, an apparatus for controlling the SMS of a digital mobile station comprises a display with a message screen capable of dividing the message screen into at least two display regions, a distinction message detector for detecting a predefined distinction message contained in a received message, and a control unit for causing the received message to be displayed on, a selected one of the at least two display regions if the distinction message is detected.

The present invention will now be described more specifically, by way of example, with reference to the attached drawings.

BRIEF DESCRIPTION OF THE ATTACHED DRAWINGS

FIG. 2 is a flow chart illustrating a method for controlling the SMS of a digital mobile station according to an embodiment of present invention;

FIG. 4 is a block diagram illustrating the changing phases of the message screens of both sender and receiver in a two-way dialogues SMS according to the present invention.

DETAILED DESCRIPTION OF THE PREFERRED EMBODIMENT

Figure 1:
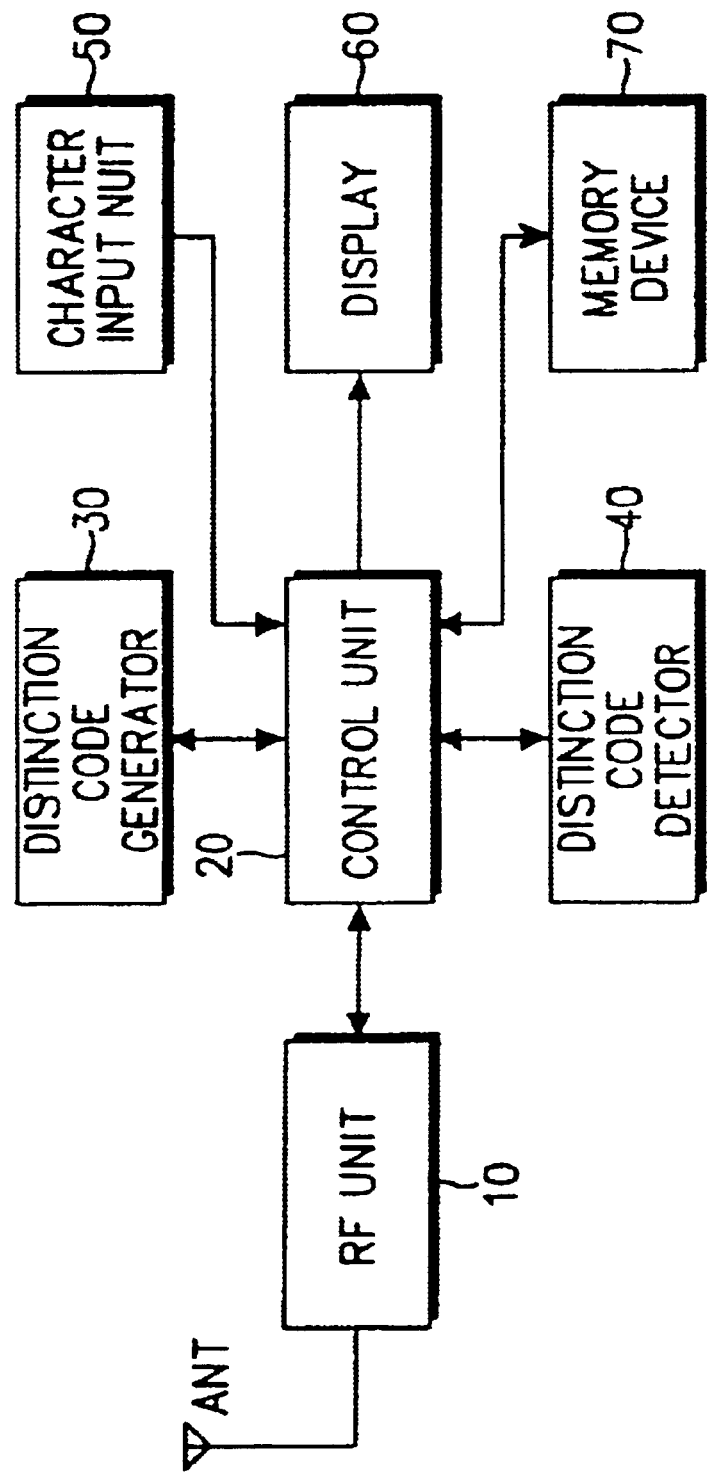
FIG. 1 is a block diagram illustrating an apparatus for controlling the SMS of a digital mobile station according to the present invention.

FIG. 1 is a schematic block diagram of the structure of a digital mobile station provided with the inventive SMS function, where the DTMF (dual tone multi-frequency) circuit and vocoder are omitted in order to clarify the inventive concept. A control unit 20 usually comprising a one-chip microprocessor controls the functions of a digital mobile station including the SMS function. A character input unit 50 consists of a keypad including a plurality of alphanumeric keys to generate key data representing the character information entered by the user. In addition, a touch screen may be provided to enter characters, consisting of a device for driving the touch screen and a character recognition device for converting the input data into the corresponding characters. A voice input device may also be employed to enter information by voice, including a voice signal processor for converting the input voice into the corresponding characters.

A memory device 70 consists of a volatile memory like RAM, and a non-volatile memory such as flash memory and/or an EEPROM to store the control program for controlling the whole functions of the digital mobile station, initial service data, SMS functional program, and the temporary data generated during operation. Of course, the edited or received short messages are also stored in memory device 70. Each short message consists of organized character codes, and its length depends on the capacity of the memory device and the message frame specified by the service provider.

A display 60 usually comprises an LCD to display the characters and numbers entered by the user together with the operational states of the mobile station. According to the present invention, the message screen of the display 60 is divided into sending and receiving message regions under the control of the control unit 20, as shown in FIG. 4. An RF unit 10 enables radio signals to be exchanged between the mobile station and base station.

A distinction code generator 30 generates a distinction code added to a short message to distinguish it as a two-way dialogue short message. A distinction code detector 40 detects the distinction code from a received message to inform the control unit 20 of its detection. Thus, the receiving mobile station performs the two-way dialog SMS function with the help of the distinction code detector 40.

Describing the procedure of exchanging short messages between the sender and receiver in real time in connection with FIG. 2, the sender enters the SMS mode in step 210. Then, at decision 212, it is determined whether it has selected the two-way dialog SMS. If so, the message screen of the display is divided into the sending and receiving display regions in step 214. If not, the ordinary one-way SMS is performed in step 230. An example of the message screen divided into at least the sending and receiving display regions is schematically shown in FIG. 4. Namely, the message sent is displayed on the sending display region, and the message received on the receiving display region. The placement of messages is accomplished with the help of the distinction code contained in the message sent or received. In addition, it is understood that the sending and receiving display regions may be arranged in a top-bottom configuration in addition to side by side and may even contain more than two regions.

Referring back to FIG. 2, the user edits a short message through the character input unit in step 216. If there is generated a start signal for sending the message to a receiver selected at decision 218, the distinction code generator 30 generates the distinction code added to the edited message in step 220. If no start signal is generated, the process returns to step 216. In step 222, the message is sent via RF unit 10 to the receiver. Then, the sending message is displayed on the sending display region of the message screen in step 224. Finally, the mobile station stands by to edit or receive another message in step 226.

The receiving mobile station stands by in step 211, and if it detects the message in step 213, it is determined in step 215 whether the received message contains the distinction code. If the received message does not contain the distinction code, ordinary SMS is performed in step 235. If the message contains the distinction code, it starts the two-way dialog SMS mode in step 217 so that the message screen is divided into the sending and receiving display regions in step 219 and displays the received message on the receiving display region in step 221, as shown in FIG. 4. Finally, the mobile station stands by to edit or receive another message in step 223, as in step 226.

Figure 3A:
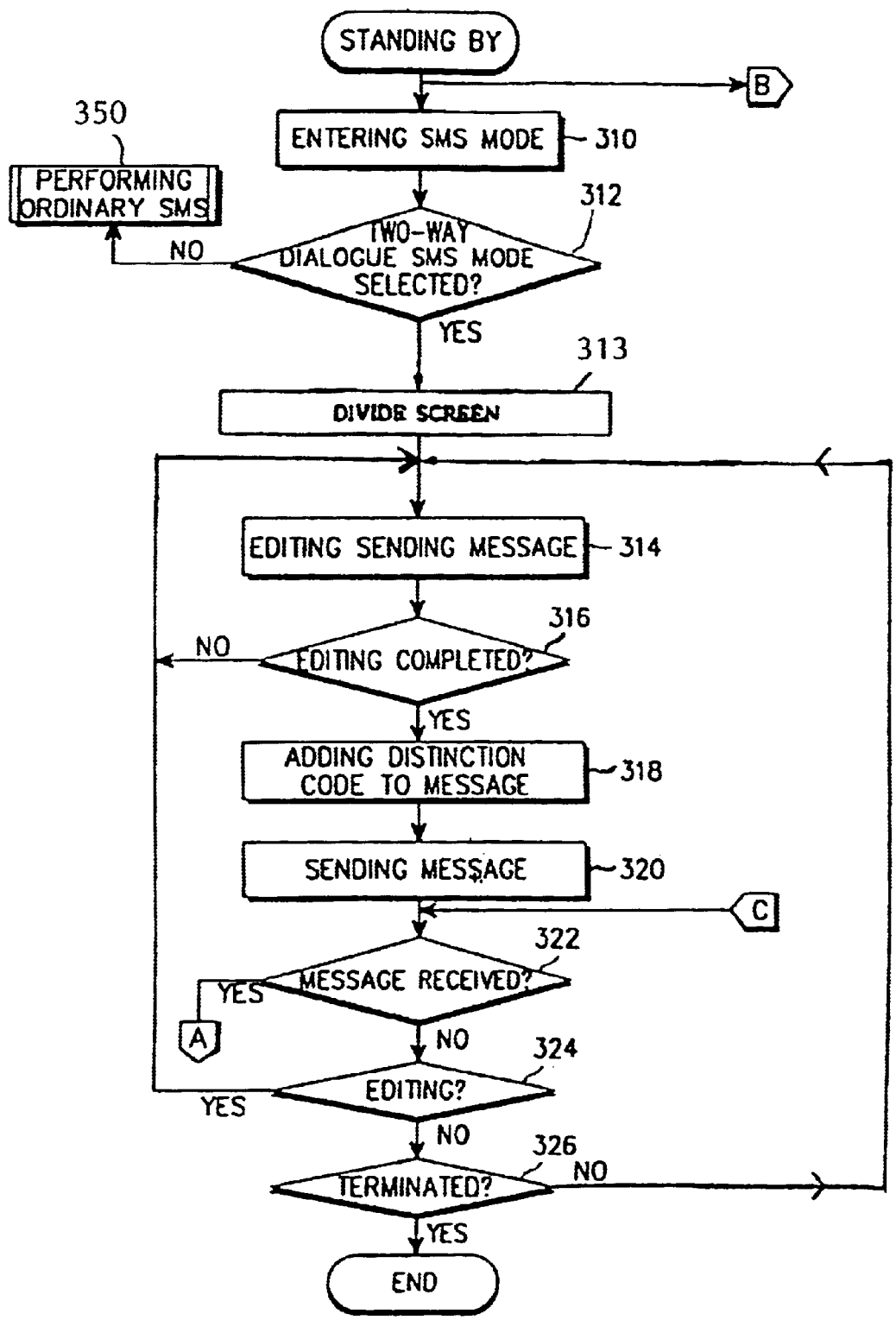
FIG. 3A is a flow chart illustrating a method for controlling the SMS of a digital mobile station according to another embodiment of present invention.

Alternatively, referring to FIG. 3A, the mobile station enters the SMS mode on the demand of the user in step 310 and also proceeds to B. At step 312, it determined whether the two-way dialog SMS mode is selected. If not, ordinary SMS is performed in step 350. If two-way dialog is selected, step 313 divides the message screen into the sending and receiving display regions, as shown in FIG. 4. Step 314 then edits a message using the sending display region. If the editing of the message is determined completed at step 316, it is added with the distinction code to distinguish it as the two-way dialogue short message in step 318. Finally, in step 320, the message is sent using RF unit 10 to the receiving mobile station, and the mobile station stands by. Of course, the message sent is displayed on the sending display region. If the editing is not complete in step 316, the process returns to step 314.

Figure 3B:
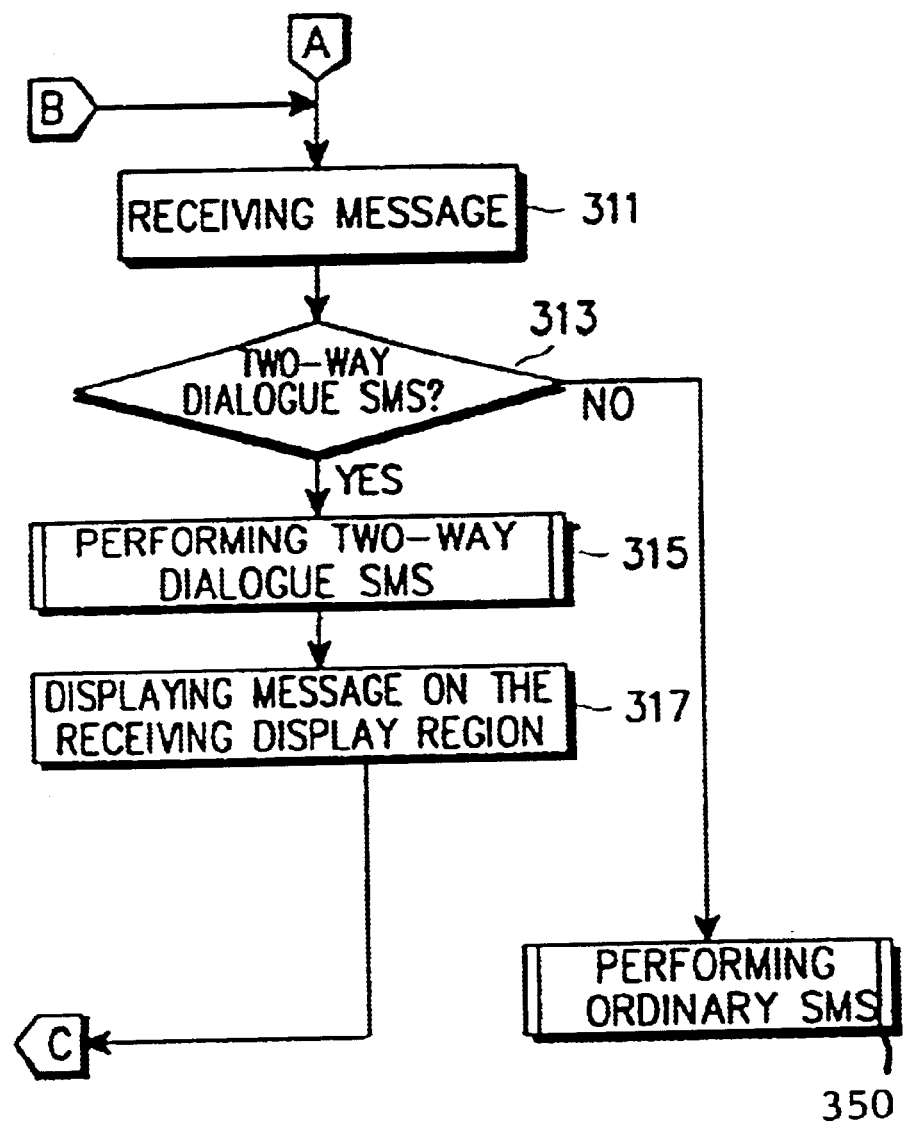
FIG. 3B is a continuation of the flowchart of FIG. 3A.

In step 322, it is determined whether a message is received. If so, the process proceeds to A. If not, step 324 is performed. Referring to FIG. 3B, step 311 receives the incoming message and step 313 determines whether the received message pertains to the two-way dialogue SMS. If so, the two-way dialogue SMS mode is performed in step 315 as in step 217 of FIG. 2, so that the receiving display region of the message screen displays the received message in step 317. Then, the process returns to step 322 of FIG. 3A. If no message is received in step 322, it is determined at step 324 whether the user desires to edit another message. This enables the sender and receiver to continuously exchange short messages. If so, the process returns to step 314. However, if not, it is determined at step 326 whether the end key is entered to terminate the two-way SMS service function. If the end key is entered, the process terminates. If the end key is not entered, the process returns to step 314. Of course, the sending or receiving of a message may be performed simultaneously. When a message is received while editing another message, the edited message may be temporarily stored in order to deal with the received message.

The distinction code to distinguish a two-way dialogue short message may be replaced by a phone number designated by the user. In addition, the two-way dialogue SMS makes the receiving display region display only the content of the received message without indicating the received time and the name of the sender as in the ordinary SMS. FIG. 4 schematically shows the two-way dialogue messages displayed on the sending and receiving display regions of the message screens of two mobile stations provided with the two-way dialogue SMS. Thus, the inventive apparatus enables both the sender and receiver to exchange short messages in a duplex mode, thereby enhancing the usability of the mobile station. While the present invention has been described in connection with specific embodiments accompanied by the attached drawings, it will be readily apparent to those skilled in the art that various changes and modifications may be made thereto without departing from the spirit of the present invention.

What is claimed is:

1. An apparatus for controlling a short message service (SMS) of a digital mobile station, comprising:
    a display with a message screen capable of dividing said message screen into at least two display regions, wherein said at least two display regions are respectively sending and receiving message display regions;
    a distinction message detector for detecting a predefined distinction message contained in a received message; and
    a control unit for causing said received message to be displayed on a selected one of said at least two display regions if said distinction message is detected.

2. The apparatus as claimed in claim 1, wherein said distinction message consists of a predefined identification code.

3. The apparatus as claimed in claim 1, wherein said distinction message consists of pre-designated phone number information.

4. The apparatus as claimed in claim 1, wherein the displayed received message is the user data.

5. An apparatus for controlling an SMS of a digital mobile station, comprising:
    a display having a message screen divided into a sending message display region and a receiving message display region; and
    a control unit for causing a sending message containing a predefined distinction message to be displayed on said sending message display region, and a received message to be displayed on the receiving message display region if the distinction message is detected from said received message.

6. The apparatus as claimed in claim 5, wherein said pre-defined distinction message consists of a pre-designated phone number or code.

7. An apparatus for controlling an SMS of a digital mobile station, comprising:
    a display having a message screen divided into a sending message display region and a receiving message display region;
    a distinction code generator for generating a distinction code and adding said distinction code to a sending message;
    a distinction code detector for detecting said distinction code from a received message; and
    a control unit for causing said sending message containing said distinction code to be displayed on said sending message display region, and a received message to be displayed on said receiving message display region if the distinction code is detected from said received message.

8. An apparatus for displaying a received message in a digital mobile station provided with an SMS function, comprising:
    a display having a message screen divided into a sending message display region and a receiving message display region in response to a signal for starting a two-way dialogue SMS; and
    a control unit for causing a received message to be displayed on the receiving message display region if a predefined distinction code is detected from the received message.

9. An apparatus for transmitting an edited message containing a distinction code in a digital mobile station provided with an SMS function, comprising:

a display having a message screen divided into a sending message display region and a receiving message display region in response to a signal for starting a two-way dialogue SMS; and a control unit for causing said edited message to be displayed on the sending message display region.

10. A method for controlling an SMS of a digital mobile station having a display with a message screen to display a received message, comprising the steps of:

detecting a predefined distinction message from said received message;

dividing said message screen into a sending message display region and a receiving message display region if said distinction message is detected;

a displaying said received message on the receiving message display region.

11. A method for providing an SMS in a digital mobile station having a display with a message screen, comprising the steps of:

dividing said message screen into a sending message display region and a receiving message display region in response to a signal for starting a two-way dialogue SMS;

displaying an edited message on the sending message display region;

adding a distinction code to said edited message; and sending said edited message in response to a send signal to an RF (Radio Frequency) transmitter.

12. The method as claimed in claim 11, wherein the step of sending said edited message is followed by a subsequent step of receiving another message.

13. The method as claimed in claim 11, wherein the step of sending said edited message is followed by a subsequent step of editing another message.

14. A method for providing an SMS in a digital mobile station having a display with a message screen, comprising the steps of:

detecting a distinction code from a received message;

entering the two-way dialogue SMS mode to divide said message screen into a sending message display region and a receiving message display region if said distinction code is detected; and displaying said received message on the receiving message display region.

15. The method as claimed in claim 14, wherein the step of displaying said received message is followed by a subsequent step of editing another message.

16. The method as claimed in claim 14, wherein the step of displaying said received message is followed by a subsequent step of receiving another message.

* * * * *